J. C. HARRIS.
MASON'S LINE HOLDER.
APPLICATION FILED JAN. 6, 1912.
1,124,310.
Patented Jan. 12, 1915.
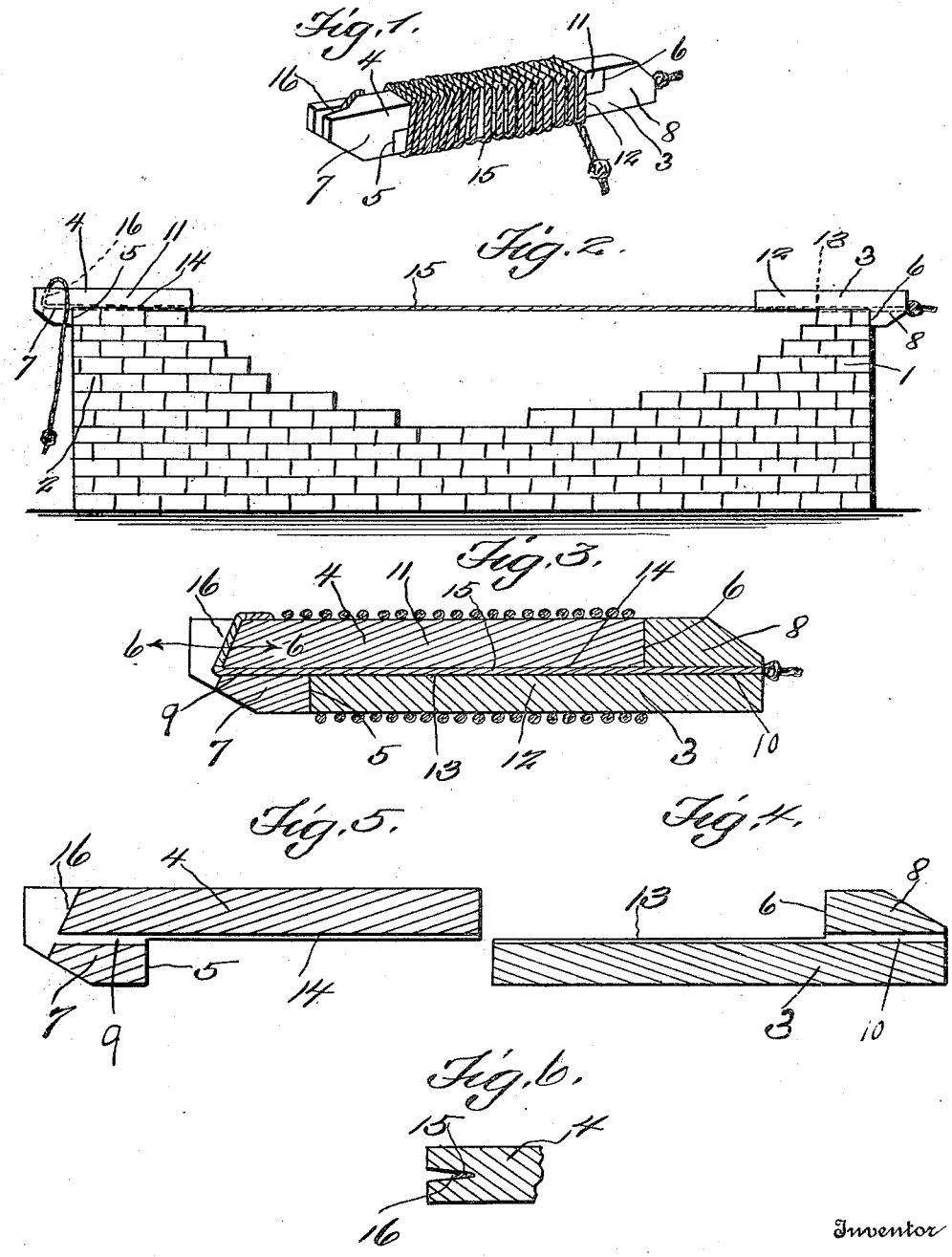
Witnesses
Francis T. Boswell,
C. E. Frothingham.
Inventor
John C. Harris,
By D. Swift
Attorney

UNITED STATES PATENT OFFICE.

JOHN C. HARRIS, OF DE BEQUE, COLORADO.

MASON'S LINE-HOLDER.

1,124,310.

Specification of Letters Patent.

Patented Jan. 12, 1915.

Application filed January 6, 1912. Serial No. 669,817.

*To all whom it may concern:*

Be it known that I, JOHN C. HARRIS, a citizen of the United States, residing at De Beque, in the county of Mesa and State of Colorado, have invented a new and useful Mason's Line-Holder; and I do hereby declare the following to be a full, clear, and exact description of the invention, such as will enable others skilled in the art to which it appertains to make and use the same.

This invention relates to the art of masonry and implements used therein, and more particularly to a holder for holding and stretching a line, whereby the mason may construct a straight and even wall or the like.

The principal object of the invention is to provide a device of this nature, for taking the place of nails or the like, which when in use for supporting a line mar the joints with nail holes or otherwise deface the fall.

The principal feature of this improved device is the provision of two duplicate members, that is in shape, each having a shoulder adapted to engage each corner pillar of the wall, whereby a line may be stretched therebetween. One of said members is provided with means for holding the line in the desired adjustment.

An advantage of this improved device is that the holder and the line may be raised or lowered without any change in the adjustment. The fact that the members are duplicate in shape, they may be arranged in engagement with one another, as shown in the drawings, with the line wrapped thereabout, thus producing a device or implement of small compass.

The invention comprises further features and combination of parts, as hereinafter set forth, shown in the drawings and claimed.

In the drawings:—Figure 1. is a view in perspective, showing the two members arranged together with the line wrapped thereabout. Fig. 2. is a view showing the application of the holder with the line stretched. Fig. 3 is a longitudinal sectional view. Fig. 4. is a sectional view through one of the members. Fig. 5 is a sectional view through the other member, and Fig. 6 is a transverse sectional view on line 6—6 of Fig. 3.

Referring more particularly to the drawings 1 and 2 designate two pillars of masonry, which constitute the ends of the wall to be built, while 3 and 4 designate the duplicate members, which as shown in the drawings are provided with shoulders 5 and 6, to engage the pillars.

The enlargements 7 and 8, which form the shoulders 5 and 6 are provided with apertures 9 and 10, while the restricted portions 11 and 12 are provided with grooves 13 and 14, which are arranged in line with the apertures, to receive the line 15, which passes through the apertures, there being a knot in each end of the line, to prevent the same from pulling through the apertures.

The member 4 is provided with a slot, as shown clearly in Fig. 6, in which slot 16 a portion of the line is arranged, so as to hold the line stretched taut, from pillar to pillar, as shown in Fig. 2. When the line is so stretched, with the shoulders of the members in engagement with the pillars, the line is received by the grooves of the restricted portions of the members. After the wall between the pillars has been built even with the line, the pillars are extended higher, and the holder and line readjusted, and then the construction of the wall between the pillars is continued as before.

The invention having been set forth, what is claimed as new and useful is:—

A mason's line holder embodying two complemental members each provided with a longitudinal groove and with an orifice head, the end of one member being arranged to contact with the head of the other member, thus to hold the parts against relative longitudinal movement, the head of one member being provided with a V-shaped crotch, and a cord passing through the heads of the members, and arranged to engage frictionally within the V-shaped crotch, and subsequently wrapped about the two members, whereby the same are held compactly together.

In testimony whereof I have signed my name to this specification in the presence of two subscribing witnesses.

JOHN C. HARRIS.

Witnesses:
FRANK HARRIS,
GRANT BALES.

Copies of this patent may be obtained for five cents each, by addressing the "Commissioner of Patents, Washington, D. C."